Aug. 17, 1926.
A. DE CLAIRMONT
1,596,584
IGNITION INDICATOR
Filed April 20, 1923   2 Sheets-Sheet 1
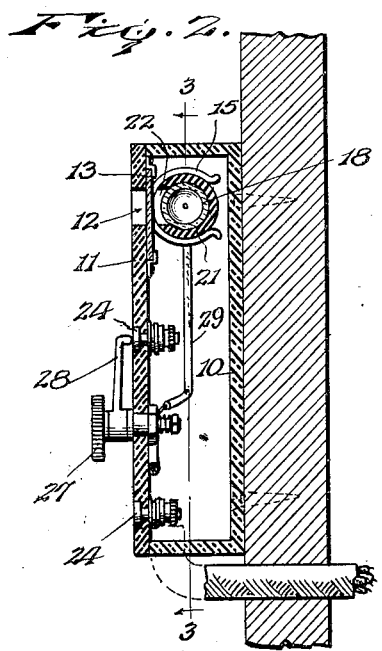
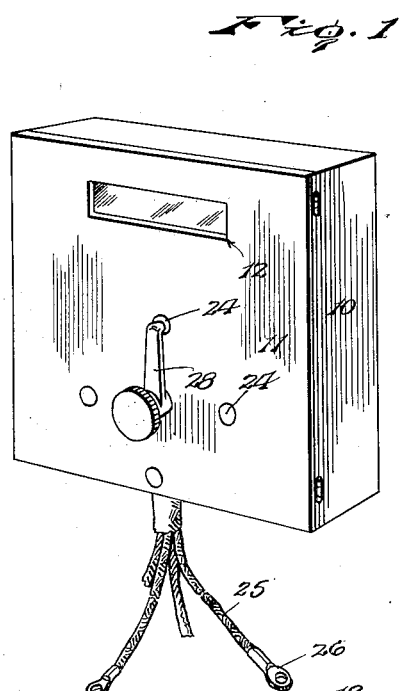
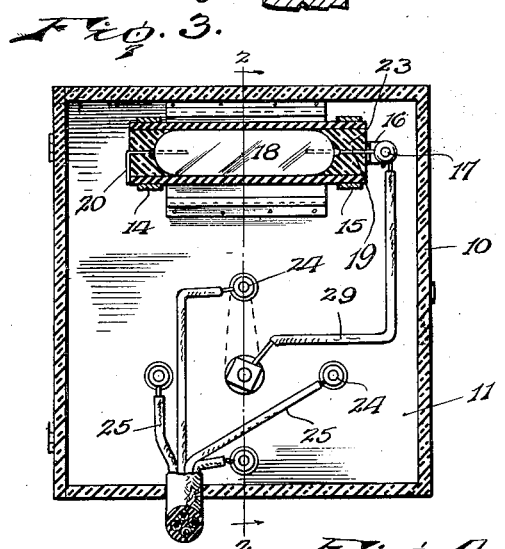
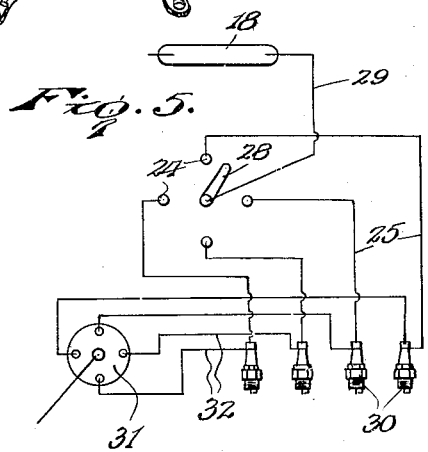
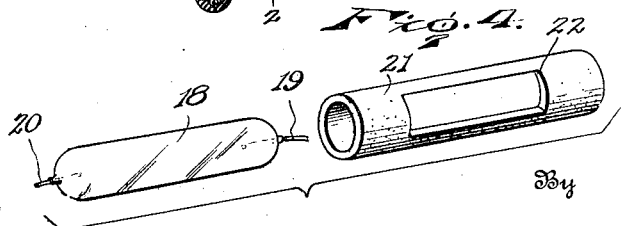
Inventor
A. de Clairmont.
By Lacey & Lacey, Attorneys

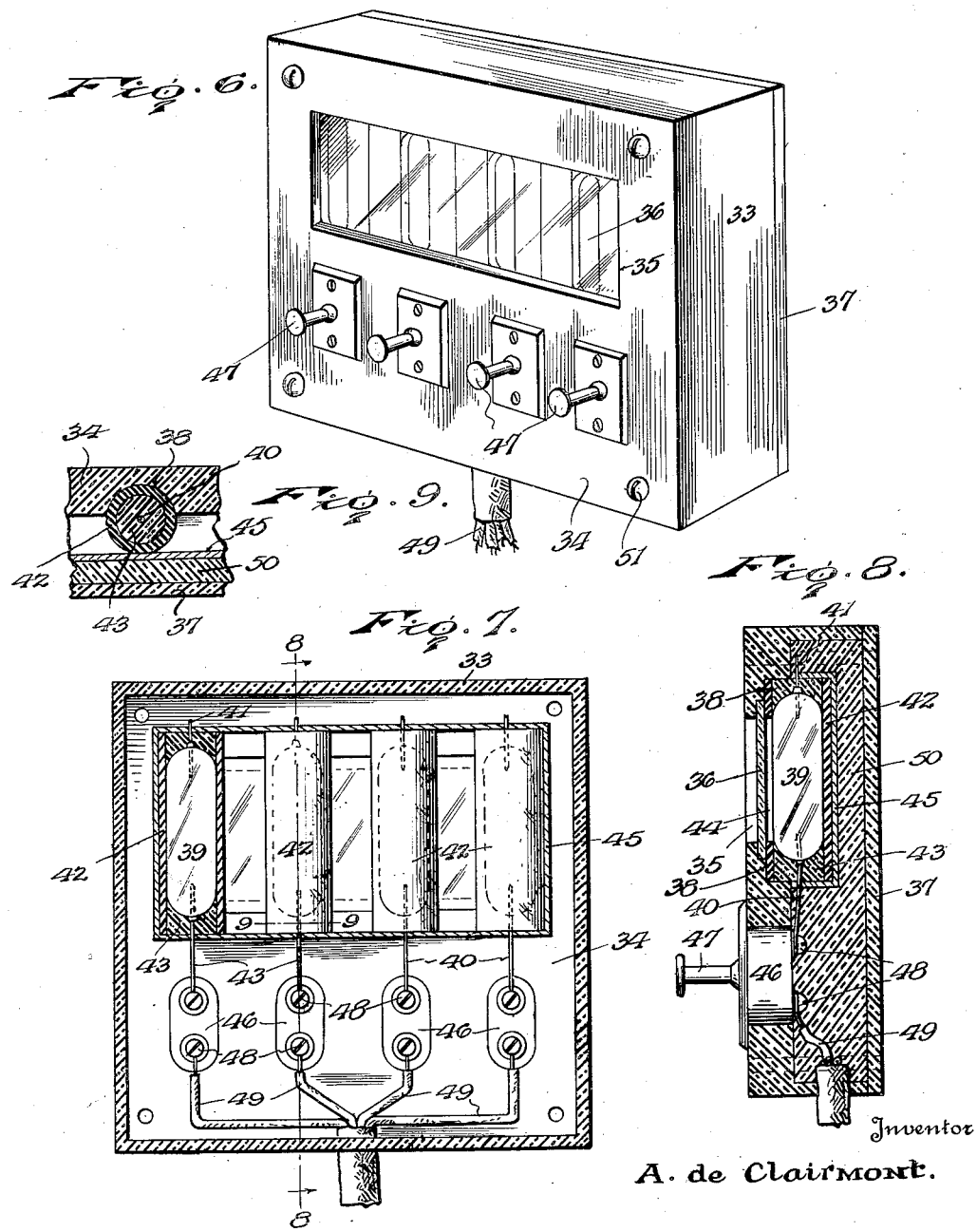

Patented Aug. 17, 1926.

1,596,584

UNITED STATES PATENT OFFICE.

ADOLFO DE CLAIRMONT, OF TOLEDO, OHIO.

IGNITION INDICATOR.

Application filed April 20, 1923. Serial No. 633,562.

This invention relates to an improved ignition indicator for internal combustion engines and seeks, among other objects, to provide a device which may be located upon the instrument board or dash of a motor vehicle for visibly indicating the functioning of the spark plugs of the vehicle engine under working conditions of the engine.

The invention seeks as a further object, to provide a device which will in no way drain the current from the spark plugs so that an accurate working test of the several plugs may be made.

The invention seeks as another object, to provide a device embodying an exhausted indicator unit containing a highly sensitive gas, such for instance, as Neon gas, easily excited by induction into fluorescence for visibly indicating the functioning of the spark plugs.

And the invention seeks as a still further object, to provide a device wherein the several spark plugs of an engine may be separately connected with the indicator unit and thus tested separately.

Other and incidental objects will appear hereinafter.

In the drawings:

Figure 1 is a perspective view of my improved device,

Figure 2 is a vertical sectional view on the line 2—2 of Figure 3, looking in the direction of the arrows, Figure 3 is a vertical sectional view at right angles to Figure 2, on the line 3—3 of Figure 2, looking in the direction of the arrows, Figure 4 is a detail perspective view of the indicator unit of the device, Figure 5 is a diagrammatic view illustrating the manner in which the device is connected with the spark plugs of a vehicle engine, Figure 6 is a perspective view showing a modification of the invention, Figure 7 is a vertical sectional view through the modified structure, Figure 8 is a sectional view on the line 8—8 of Figure 7, looking in the direction of the arrows, and Figure 9 is a detail sectional view on the line 9—9 of Figure 7.

In carrying the invention into effect, I employ a casing 10 which, as suggested in Figure 2, may be appropriately secured to the dash or instrument board of a motor vehicle and normally closing the casing is a hinged cover 11 forming the front wall of the casing and in which is provided a sight opening 12 closed by a transparence 13 at the inner side of the cover. Mounted upon the cover at the ends of said sight opening are resilient clips 14 and 15 from the latter of which projects an ear 16 carrying a binding screw 17, and mounted by said clips is the indicator unit of the device. As particularly brought out in Figures 2 and 4, this indicator unit includes an appropriately evacuated glass tube or vessel 18 at the ends of which are conductors 19 and 20 extending into the tube. Sealed within the tube is a trace of suitable gas possessing the quality of fluorescence when excited by the inductive action of a high potential current. Neon, Argon, or Crypton gas may be used but I preferably employ Neon gas. Snugly surrounding the tube is a tubular rubber jacket 21 in which is formed a sight opening 22 and closing the jacket at its ends are plastic or other suitable insulating plugs 23 surrounding the conductors 19 and 20 and sealing the tube within the jacket. Thus, the indicator unit may be readily mounted upon the clips 14 and 15, the spring fingers of which are formed to snugly embrace the end portions of the jacket at the plugs 23 for firmly yet removably supporting the unit, the sight opening 22 of the jacket 21 being, as shown in Figure 2, disposed to register with the sight opening 12 in the cover 11. The jacket 21 is flexible and resilient so that said jacket thus provides a surrounding cushioning element for the tube 18, while the plugs 23 are rigid and provide solid rigid cores within the ends of the jacket bearing against the ends of the tube to coact therewith for rigidly supporting the electrodes 19 and 20 and preventing the bending thereof by the flexing of the ends of the jacket. As will be observed, the conductor 19 of said unit is connected to the binding post 17 of the clip 15 while the conductor 20 is bent over against the plug at the adjacent end of the jacket 21 to contact the jacket.

Mounted upon the cover 11 below the sight opening 12 therein is a plurality of switch points 24 to the inner ends of which are connected circuit wires 25 extending through the bottom of the casing 10 and provided at their free ends, as suggested in Figure 1, with appropriate connectors 26. Rotatable upon the cover is a switch member 27 having a spring arm 28 which may, by rotating the switch member, be swung to engage the several switch terminals selectively, and electrically connected at one end with said switch member is a wire 29, the opposite end of which is secured by the binding screw 17 and thus electrically connected with the conductor 19 of the indicator unit. In use, the connectors 26 of the wires 25 are, as diagrammatically suggested in Figure 5, attached to the center electrodes of the spark plugs 30 of a vehicle engine. In this figure of the drawings, I have conventionally illustrated the distributer of the ignition system of the engine at 31 and the wires leading from said distributer to the engine spark plugs, at 32. As is well known, these wires 32 are provided with connectors so that said wires may be easily attached to the spark plugs and, if preferred, the wires 25 may be soldered at their free ends directly to said connectors, eliminating the connectors 26. In the present instance, I have shown the device as it would be constructed for use in connection with a four cylinder engine. To suit the requirements of a six cylinder engine, the number of the switch points 29 as well as the number of the wires 25, would, of course, be increased accordingly.

As will now be appreciated in view of the foregoing, the switch member 27 with its arm 28 provides a means whereby the spark plugs 30 may be separately connected electrically with the indicator unit by swinging the arm to engage the switch terminals 24 successively. Accordingly, the plugs may be individually tested. When any one of the plugs is thus connected with the indicator unit, the occurrence of a spark at the spark terminals of the plug will, by inductive action, serve to excite the gas in the tube 18 with the result that the gas will be rendered luminous and a flash will appear in the tube coincident with the jumping of the spark at the spark plug. The flash in the tube may, of course, be observed through the sight opening 12 of the casing 10 and different faulty conditions of the plug such as oil fouling, sooting, or leakage and the like, will, of course, create a corresponding variation in the brilliancy or color of the flash appearing in the tube. Accordingly, the particular trouble present in each plug, if any, may be readily determined. If desired, the transparency 13 may be colored to enhance the visibility of the flash occurring in the tube.

In Figures 6 to 9 inclusive of the drawings, I have illustrated a modification of the invention wherein I provide a separate indicator unit for each cylinder of the engine. An oblong casing 33 is employed. This casing is formed of suitable insulating material and is provided with a front wall 34 in which is formed a sight opening 35 closed by a transparency 36 as in the prior embodiment of the invention, and closing the casing at its rear side is a back plate or wall 37. Formed in the wall 34 of the casing at the upper and lower edges of the sight opening 35, are pairs of alined sockets or channels 38 and seating at their ends in said sockets is a plurality of indicator units. These indicator units are identical with the indicator unit previously described in connection with the prior embodiment of the invention and each includes an evacuated tube or vessel 39 containing a trace of preferably Neon gas. At the ends of the tube are conductors 40 and 41 and surrounding the tube is a rubber jacket 42 closed at its ends by plugs 43, the jacket being provided with a sight opening 44 exposing the tube at the sight opening 35 of the casing. Housing the indicator units is a cover 45 of celluloid or other approved material snugly fitting over said units to abut the front wall 34 of the casing. As shown in Figure 8, the upper and lower side walls of said cover are notched to receive the conductors 40 and 41 therethrough and mounted against the front wall 34 of the casing at its inner side below the indicator units are appropriate switches 46, a switch being provided in connection with each of said units. These switches are of the double pole type and are provided with plungers 47 slidable through the wall 34 while at the inner ends of the switches are binding screws 48. As shown in Figure 7, the conductors 40 of the indicator units are secured to the uppermost of said binding screws and secured by the lowermost of said binding screws are circuit wires 49 extending through the bottom wall of the casing, these wires corresponding to the circuit wires 25 of the prior embodiment of the invention. Poured into the casing to seal the several parts therein is an appropriate insulating filler 50 which, when set, serves to exclude all moisture as well as retain the cover 45 so that the cover will be held against the indicator units for maintaining said units firmly in place in the seats therefor. Formed through the front wall 34 of the casing and through the filler, as well as through the back plate 37, are suitable openings to receive screws or other appropriate fastening devices 51 for mounting the device.

In use, the wires 49 are connected with the spark plugs of the vehicle engine, as described in connection with the prior embodiment of the invention, when, as will be seen, by pulling outwardly upon the switch plungers 47 to close the switches 46, each plug may be tested separately, or, if preferred, any two, or three, or all of the plugs may be tested simultaneously.

Having thus described the invention, what is claimed as new is:

1. In an ignition indicator for internal combustion engines, the combination of a casing having a front wall provided with a sight opening, a fluorescent gas containing unit abutting said wall to extend across the sight opening and provided at its ends with electrodes, means for connecting one of said electrodes in an open shunt circuit with the high tension current supply lead of a spark plug, a cover within the casing abutting said front wall to overlie said sight opening closing said opening at the back thereof and housing said unit, and a plastic medium within the casing embedding the latter electrode and overlying the cover for retaining the cover and said unit within the casing as well as supporting the cover and unit in position.

2. In an ignition indicator for internal combustion engines, the combination of a casing having a front wall provided with a sight opening and formed above and below said opening with alined channels, a fluorescent gas containing unit fitting at its ends in said channels to extend across said sight opening and provided with electrodes, means for connecting one of said electrodes in an open shunt circuit with the high tension current supply lead of a spark plug, a cover within the casing abutting said front wall to overlie said sight opening closing said opening at the back thereof and housing said unit, and a plastic medium within the casing embedding the latter electrode and overlying the cover, said medium forming the sole retaining means for securing the cover and unit within the casing and supporting the cover and unit in position.

3. In an ignition indicator for internal combustion engines, a fluorescent gas containing unit including an evacuated tube containing a trace of fluorescent gas and provided at its ends with electrodes, a yieldable cushioning jacket snugly surrounding said tube and provided at one side with a sight opening, and rigid plugs fitting in the ends of said jacket and retaining the tube therein, said plugs surrounding the electrodes and bearing against the ends of the tube to coact therewith for rigidly supporting the electrodes and preventing the bending thereof by the flexing of the ends of the jacket.

4. In an ignition indicator for internal combustion engines, a fluorescent gas containing unit including an evacuated tube containing a trace of fluorescent gas, a yieldable cushioning jacket snugly surrounding said tube and provided at one side with a sight opening, plugs in the ends of said jacket retaining the tube therein and providing rigid cores for holding the ends of the jacket against collapsing, and a casing having means to fit about the ends of the jacket at said cores seating the unit.

In testimony whereof I affix my signature.

ADOLFO DE CLAIRMONT.